(12) United States Patent
Wittorf (10) Patent No.: US 10,384,619 B2
(45) Date of Patent: Aug. 20, 2019

(54) MOTOR VEHICLE WITH LOAD COMPARTMENT FLOOR

(71) Applicant: GM GLOBAL TECHNOLOGY OPERATIONS LLC, Detroit, MI (US)

(72) Inventor: Marten Wittorf, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 15/638,028

(22) Filed: Jun. 29, 2017

(65) Prior Publication Data

US 2018/0001831 A1    Jan. 4, 2018

(30) Foreign Application Priority Data

Jul. 4, 2016 (DE) .................. 10 2016 008 159

(51) Int. Cl.
*B60R 9/06* (2006.01)
*B60R 5/04* (2006.01)
(Continued)

(52) U.S. Cl.
CPC ............ *B60R 9/065* (2013.01); *B60P 3/41* (2013.01); *B60R 5/04* (2013.01); *B62D 43/04* (2013.01);
(Continued)

(58) Field of Classification Search
CPC ... B60R 9/065; B60R 5/04; B60P 3/41; B60P 1/003; B60P 1/52; B62D 43/04; E05Y 2201/636; E05Y 2600/60; E05Y 2900/50
See application file for complete search history.

(56) References Cited

U.S. PATENT DOCUMENTS

| 4,668,559 A | 5/1987 | Mussallem |
| 4,750,604 A * | 6/1988 | Cook ................. B60P 1/02 198/468.6 |

(Continued)

FOREIGN PATENT DOCUMENTS

| CN | 202716775 U | 2/2013 |
| CN | 203078374 U | 7/2013 |

(Continued)

*Primary Examiner* — D Glenn Dayoan
*Assistant Examiner* — Melissa A Black
(74) *Attorney, Agent, or Firm* — Lorenz & Kopf, LLP (57) ABSTRACT

A mounting mechanism for mounting a moveable bearing part relative to a counter-bearing part, including the moveable bearing part with a plurality of bearing elements, the counter-bearing part with counter-bearing elements which are locally moveable relative to the remaining counter-bearing part from a starting position into a deformation position and vice versa, wherein the bearing elements a contact surface each lie on a counter-contact surface of the counter-bearing elements each for the force transmission from the bearing elements to the counter-bearing elements so that the bearing elements are in mechanical operative connection with the counter-bearing elements because of the contact between bearing elements and the counter-bearing elements and a movement of the bearing part with the bearing elements causes a local relative movement of those counter-bearing elements from the starting position into the deformation position, which counter-bearing elements are in mechanical operative connection with the bearing elements and the local relative movement of the counter-bearing elements from the starting position into the deformation position causes an elastic deformation of elastic components and following the termination of the mechanical operative connection an elastic recovery of the elastic component causes a return movement of these counter-bearing elements from the deformation position into the starting position.

14 Claims, 5 Drawing Sheets

(51) Int. Cl.
  *B60P 3/41*   (2006.01)
  *B62D 43/04*  (2006.01)
  *B60P 1/00*    (2006.01)
  *B60P 1/52*    (2006.01)

(52) U.S. Cl.
  CPC ............... *B60P 1/003* (2013.01); *B60P 1/52* (2013.01); *E05Y 2201/636* (2013.01); *E05Y 2600/60* (2013.01); *E05Y 2900/50* (2013.01)

(56) References Cited

U.S. PATENT DOCUMENTS

| | | |
|---|---|---|
| 2007/0212184 A1 | 9/2007 | Borroni-Bird |
| 2011/0104430 A1 | 5/2011 | Mehrabi et al. |
| 2011/0159230 A1 | 6/2011 | Goode |

FOREIGN PATENT DOCUMENTS

| | | |
|---|---|---|
| JP | 2003104114 A | 4/2003 |
| JP | 20090400235 A | 2/2009 |
| KR | 20100108765 A | 10/2010 |
| KR | 101262241 B1 | 5/2013 |
| KR | 20130104461 A | 9/2013 |
| KR | 101569207 B1 | 11/2015 |

\* cited by examiner

MOTOR VEHICLE WITH LOAD COMPARTMENT FLOOR

CROSS-REFERENCE TO RELATED APPLICATION

This application claims priority to German Patent Application No. 102016008159.7, filed Jul. 4, 2016, which is incorporated herein by reference in its entirety.

TECHNICAL FIELD

The present disclosure pertains to a mounting mechanism, to a method for mounting a moveable bearing part relative to a partly fixed counter-bearing part and to a motor vehicle.

BACKGROUND

Motor vehicles with seats for transporting persons often include a trunk or load compartment for transporting load items therein. The trunk is generally delimited in a longitudinal direction of the motor vehicle at the front side by a back part of a backseat and at the back delimited in longitudinal direction by a tailgate and an interior trim as well as a part of the body of the motor vehicle. Laterally, the trunk is delimited by lateral trim on the body of the motor vehicle. At the bottom, the trunk is delimited by a load compartment floor, which serves for supporting the load items on a top side of the load compartment floor. The load compartment floor includes a stiff plate-like loading floor support and a cover fastened on a top side of the loading floor support, in general in the form of a fitted carpet or a felt covering. A sound insulation is generally attached on the lower side of the loading floor support. A portion of the load compartment floor is removable from the remaining motor vehicle and/or pivotable in order to be able to remove a spare wheel arranged below the load compartment floor in a spare wheel trough or other items. At least a portion of the load compartment floor thus bridges the spare wheel trough.

The load compartment floor or a part of the load compartment floor is moveably mounted in longitudinal direction by a longitudinal roller bearing. As such, items as load items can be moved on the moveable load compartment floor by a movement of the load compartment floor to facilitate removal from the trunk or facilitate placement into the trunk in longitudinal direction of the motor vehicle. Disadvantageously, longitudinal roller bearings are expensive to manufacture and take up a large installation space and furthermore because of the mounting of the load compartment floor by the longitudinal roller bearing, the load compartment floor is moveable only in longitudinal direction.

From US 2011/0159230 A1 a pad with a plurality of fibers, which are fastened to a base, is known. Accordingly, there is a need to provide a mounting mechanism, a method for mounting a moveable bearing part relative to a partly fixed counter-bearing part and a motor vehicle, in the case of which the mounting mechanism requires little installation space, is cost-effective to manufacture and causes low friction.

SUMMARY

In accordance with the present disclosure, a mounting mechanism is described for mounting a moveable bearing part relative to a counter-bearing part, which includes the moveable bearing part with a plurality of bearing elements, the counter-bearing part with counter-bearing elements which relative to the remaining counter-bearing part are locally moveable from a starting position into a deformation position and vice versa. The bearing elements, each with a contact surface, lie on a counter-contact surface of the counter bearing elements in each case for the force transmission from the bearing elements to the counter-bearing elements so that the bearing elements are mechanically connected with the counter-bearing elements because of the contact between bearing elements and the counter-bearing elements and a movement of the bearing part with the bearing elements causes a local relative movement of those counter-bearing elements from the starting position into the deformation position. The counter-bearing elements are operatively connected mechanically with the bearing elements. The local relative movement of the counter-bearing elements from the starting position into the deformation position causes an elastic deformation of elastic components and following the termination of the mechanical operative connection, an elastic recovery of the elastic components causes a movement of these counter-bearing elements from the deformation position into the starting position. The mounting mechanism includes a moveable bearing part with a plurality of bearing elements and a partly fixed counter-bearing part. A counter-bearing fastening device of the counter-bearing part is fixed so that because of this the bearing part including the bearing elements is completely moveable on the mounting mechanism and the counter-bearing part is partially fixed.

On the counter-bearing part, only the counter-bearing elements are moveable relative to the remaining counter-bearing part, in particular the counter-bearing fastening device. To elastically deform the elastic components, low forces are thus necessary. In particular the elastic components have a low spring constant or low spring stiffness. Thus, low forces are necessary for the local movement of the counter-bearing elements so that because of this low forces have to be applied on the bearing part for moving the bearing part relative to the counter-bearing part. Because of this, items can be easily moved on the bearing part by exerting a low force.

In an additional embodiment, gaps are formed between the bearing elements as free space for the return movement of the counter-bearing elements from the deformation position into the starting position. Thus, elastic components have to exert low restoring forces on the counter bearing elements for the return movement of the counter elements since the counter-bearing elements are located in the gaps during the return movement. Because of the movement of the bearing part and the kinematic movement possibility of the counter-bearing elements, the gaps cause the mechanical contact between the bearing elements and the counter-bearing elements to be cancelled.

In an additional configuration, the counter-bearing elements are moveable on the counter-contact surfaces substantially parallel to the movement path of the moveable bearing part. Preferably, an own movement, in particular a rotary, rolling or pivot movement of the counter-bearing elements for the counter-bearing elements to roll on the contact surfaces and/or a rolling surface for determining the movement or movement path of the counter-contact surfaces of the counter-bearing elements is not taken into account. The counter-bearing elements are moveable on the counter-contact surfaces substantially in parallel, i.e. with a deviation of less than 30°, 20°, 10°, 5° or 3° to the movement path of the moveable bearing part. A directed movement path, for example substantially as a straight line or a pitch circle, is therefore possible since the bearing part supports itself by the counter-bearing elements. For example, a counter-bearing element as a roller, which rolls on a flat rolling surface of the counter-bearing fastening device, has a straight movement or movement path on the counter-contact surface.

In an additional configuration, the counter-bearing elements do not have any or substantially no elastic deformability and/or movability on the counter-contact surfaces perpendicularly to the movement path of the moveable bearing part for the force transmission from the bearing elements to the counter-bearing elements. The moveable bearing part supports itself by the counter-bearing elements so that because of this substantially no movement of the bearing part perpendicularly to the movement path of the bearing part occurs even in the case of large forces which act on the bearing part perpendicularly to the movement path. Consequently, the bearing part can also absorb large forces.

In an additional configuration, the moveable bearing part includes a bearing fastening device, in particular a bearing plate or a bearing grid, with bearing elements formed on the bearing fastening device. The bearing elements are fixedly connected to the bearing fastening device so that the bearing elements completely perform the movement of the bearing fastening device and preferably a movement of the bearing elements relative to the bearing fastening device is excluded. Thus, the counter-bearing part is preferably completely moveable and/or is completely moved.

Practically, the counter-bearing part includes a fixed counter bearing fastening device, in particular a counter-bearing plate or a counter-bearing grid with counter-bearing elements formed on the counter-bearing fastening device. The counter-bearing fastening device is fixed and the counter-bearing elements formed or fastened on/to the counter-bearing fastening device are locally moveable relative to the counter-bearing fastening device.

In an additional embodiment, the bearing fastening device and the counter-bearing fastening device may be configured flat or curved. In the case of a movement path as a straight line the bearing fastening device and the counter-bearing fastening device are configured flat and in the case of a movement path of the bearing part with a curvature, the bearing fastening device and the counter-bearing fastening device are configured curved. Preferably, the curvature radius of the movement path of the bearing part corresponds to the curvature radius of the bearing fastening device and the counter-bearing fastening device.

In an additional embodiment, the curvature of the bearing plate and of the counter-bearing plate substantially corresponds to the curvature of the movement path of the moveable bearing part. The curvature of the bearing fastening device and/or counter-bearing fastening device thus corresponds to the curvature of the movement path of the moveable bearing part with a deviation of in a range between 30% and 5%.

In a complementary version, only one elastic component is assigned to each counter-bearing element. Practically, the counter-bearing elements are substantially designed ball-shaped or roller-shaped. A counter-bearing element as a ball or roller can roll on a counter-bearing fastening device. In an additional configuration, the elastic components are part of the counter-bearing elements or the elastic components are separate components in addition to the counter-bearing elements.

According to the present disclosure, a method is also disclosed for mounting a moveable bearing part relative to a partially fixed counter-bearing part with a mounting mechanism. A bearing force is exerted on a partly fixed counter-bearing part with a moveable bearing part having a plurality of bearing elements that are locally moveable relative to the remaining counter-bearing part from a starting position into a deformation position and vice versa. Contact surfaces of the bearing elements lie on counter-contact surfaces of the counter-bearing element. A force is exerted on the moveable bearing part so that the moveable bearing part is moved relative to the counter-bearing part. Because of the contact between the bearing elements and the counter-bearing elements on the contact surfaces and counter-contact surfaces and because of the movement of the bearing part from the bearing elements to the counter-bearing elements, a deformation is transmitted and the deformation force causes a movement of the counter-bearing elements from a starting position into a deformation position and an elastic deformation of the elastic components, cancelling the contact between at least one bearing element and at least one counter-bearing element and elastic return movement of this at least one bearing element on which the contact has been cancelled from the deformation position into the starting position because of an elastic recovery of the at least one elastic component, which is assigned to this at least one bearing element. Preferably, the counter-bearing fastening device is fixed on the counter-bearing part and the counter-bearing elements are moveable and/or are moved. The bearing part is preferably completely moveable and/or is completely moved.

In a complementary configuration, the local relative return movement of the counter-bearing elements from the deformation position into the starting position is performed in gaps between the bearing elements.

In an additional configuration, the contact surfaces of the bearing elements in time one after the other contact, during the movement of the bearing part relative to the counter-bearing part, counter-contact surfaces of different counter-bearing elements and preferably the respective bearing element, for a respective bearing element in a transitionary period of time between the cancellation of the contact from a previous counter-bearing element and the establishment of the contact with a subsequent bearing element the respective bearing element in the transition period does not have any contact with a counter-bearing element and preferably during the transition period the return movement of the respective previous counter-bearing element from the deformation position into the starting position is performed.

A motor vehicle according to the present disclosure, including a body, at least one drive motor, in particular an internal combustion engine and/or an electric motor, a load compartment for receiving load items, a moveable load compartment floor for the lower delimitation of the load compartment and for supporting load items on the load compartment floor, a mounting mechanism for the moveable load compartment floor wherein the mounting mechanism is designed as a mounting mechanism as described in this patent application and/or by the mounting mechanism a method described in this patent application can be carried out.

In a further version, substantially no relative movement between the contact surface and the counter-contact surface occurs during the contact between a bearing element each on the contact surface and a counter-bearing element each on the counter-contact surface.

In an additional configuration, a restoring force is exerted by at least one elastic component during the elastic recovery of the at least one elastic component onto at least one counter-bearing element so that because of the restoring force the at least one counter-bearing element is moved from the deformation position into the starting position.

In a further configuration, only a part of the bearing elements is operatively connected mechanically with a part of the counter-bearing elements.

In a further version, a bearing element each is in mechanically operative connection with a counter-bearing element each.

Practically, a method described in this patent application can be carried out with the mounting mechanism.

Preferably, the bearing fastening device and/or the counter-bearing fastening device is designed as a grid or a framework.

In a complementary embodiment, the moveable bearing part with the mounting mechanism is moveably mounted relative to the partially fixed counter-bearing part in a first movement direction and a second movement direction and the first and second movement direction stand perpendicularly on one another. The mounting mechanism thus makes possible in an advantageous manner a moveable mounting of the bearing part in different directions, for example in two translatory movement directions which stand perpendicularly on one another, so that the bearing part can be moved as desired within a fictitious plane and in the process is continuously mounted. Deviating from this, the moveable bearing part can also be mounted with the mounting mechanism in two curve movement directions standing perpendicularly on one another, in particular in the case of curved movement directions with a constant curvature radius, the moveable bearing part is mounted within a fictitious spherical surface or part spherical surface.

In a further configuration, the load compartment floor is formed from metal and/or wood and/or plastic. Practically, the load compartment floor is designed plate-shaped and/or stiff.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
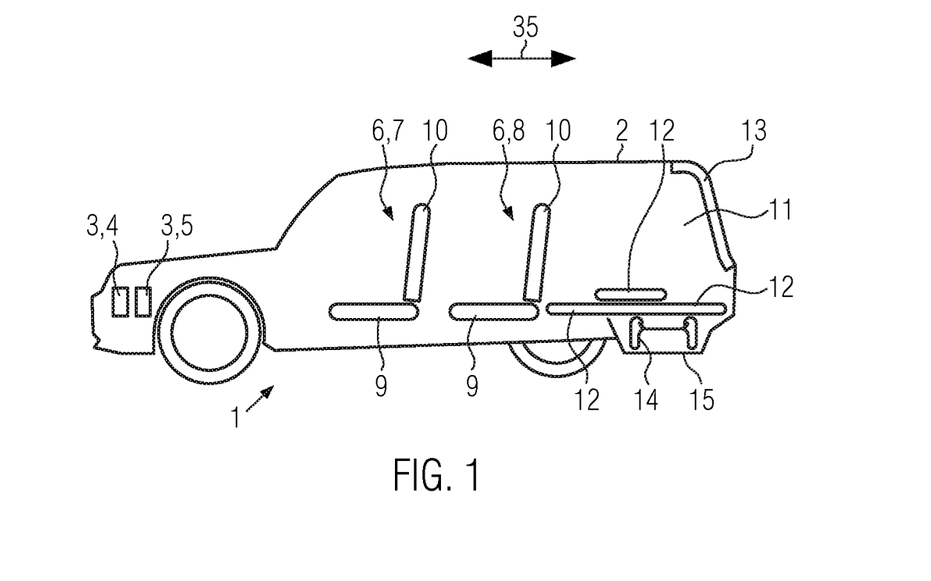
FIG. 1 shows a longitudinal section or lateral view of a motor vehicle.

The following detailed description is merely exemplary in nature and is not intended to limit the invention or the application and uses of the invention. Furthermore, there is no intention to be bound by any theory presented in the preceding background of the invention or the following A motor vehicle 1 shown in FIG. 1 includes a body 2, generally made of steel. The motor vehicle 1 is driven by a drive motor 3, namely an electric motor 4 and/or an internal combustion engine 5. The body 2 defines an interior within which seats 6, namely front seats 7 and back seats 8 are arranged for accommodating passengers or persons. Seats 6 each include a seat part 9 and a back part 10. Behind the back seats 8, a trunk 11 is formed between the back seat 8 and a pivotable tailgate 13. The trunk 11 or load compartment 11 is delimited at the bottom side by a moveable load compartment floor 12. Below the load compartment floor 12, a spare wheel trough 15 is formed by the body 2. Within a receiving space between the load compartment floor 12 and the spare wheel trough 15 a spare wheel 14 and a vehicle-own toolbox (not shown) is arranged. In this context, the terms trunk 11 and load compartment 11 are considered synonymous. The load compartment floor 12 serves for supporting load items on a top side of the load compartment floor 12. During the normal use as load compartment floor 12 for supporting load items, the load compartment floor 12 is substantially orientated horizontally. The top side in this case is formed by a covering as carpet and the covering is fastened to the loading floor support with an adhesive connection in a firmly bonded manner on a top side of a stiff, flat and plate-like loading floor support. The motor vehicle 1 includes a large load compartment floor 12 which covers or delimits the entire bottom side of the trunk 11 and a further small load compartment floor 12 above this large load compartment floor 12 and this smaller load compartment floor 12 is moveable by a mounting mechanism 16 in a movement path 35 which corresponds to a longitudinal direction 35 of the motor vehicle 1.

Figure 2:
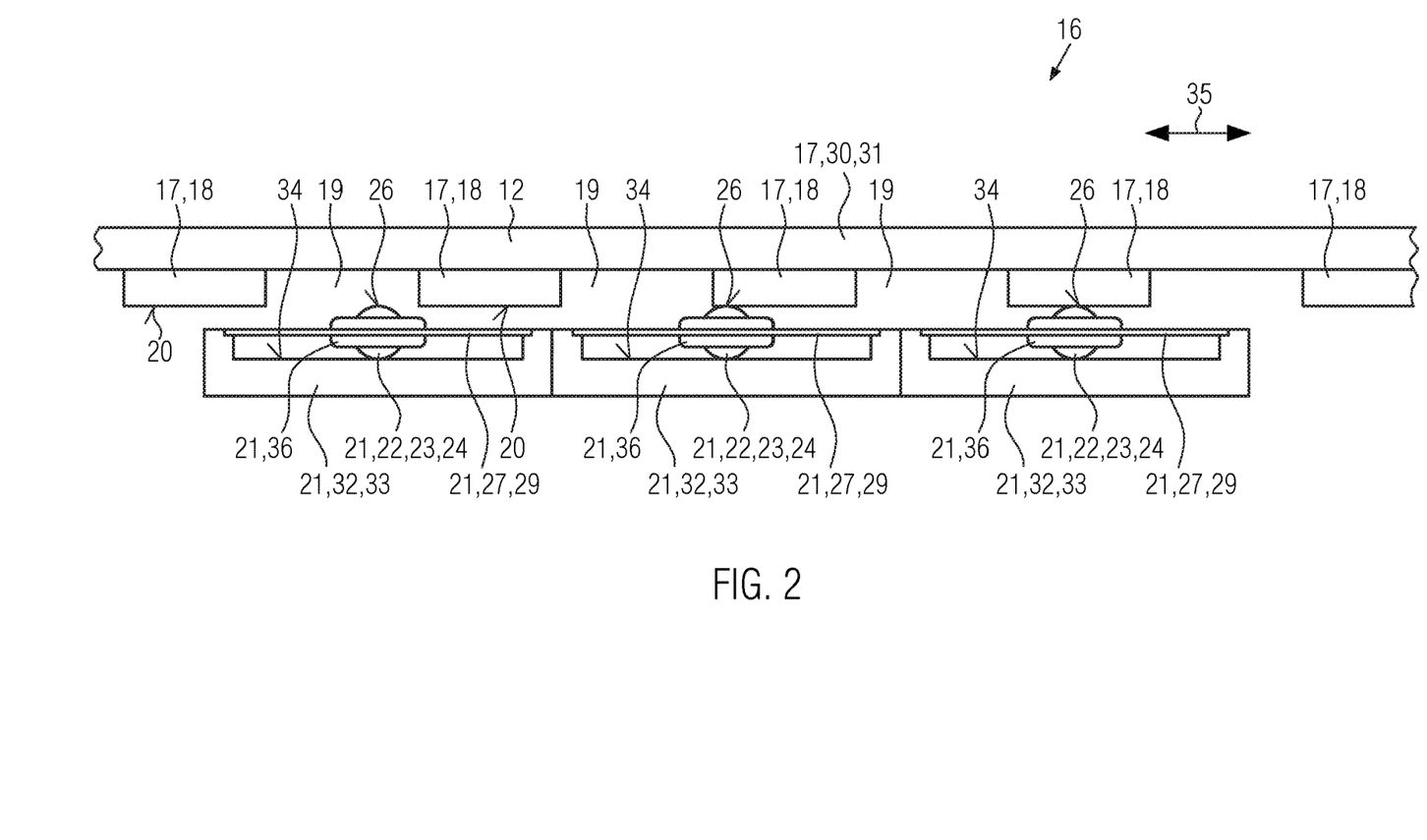
FIG. 2 shows a longitudinal section of a bearing mechanism in a first exemplary embodiment.

In FIG. 2, a first exemplary embodiment of the mounting mechanism 16 is shown. The mounting mechanism 16 substantially includes a bearing part 17 and a counter-bearing part 21. The bearing part 17 corresponds to the load compartment floor 12 and is moveably mounted relative to the fixed counter-bearing part 21 by the mounting mechanism 16. The bearing part 17 includes a bearing plate 31 as a flat bearing plate 31 as bearing fastening device 30 and a plurality of bearing elements 18. The bearing elements 18 are formed connector-like and fastened on the bottom side of the bearing plate 31. Between the bearing elements 18, gaps 19 are thus present and a lower end region of the bearing elements 18 each includes a contact surface 20. The counter-bearing part 21 includes a flat counter-bearing plate 33 as a counter-bearing fastening device 32 and a plurality of counter-bearing elements 22 are fastened to the counter-bearing fastening device 32. The counter-bearing fastening device 32 is fixed on the body 2. The counter-bearing elements 22 are locally moveable relative to the remaining counter-bearing part 21, i.e. the counter-bearing plate 33. The counter-bearing elements 22 are designed as a ball 23 or a roller 24 and can thus roll on a rolling surface 34 of the counter-bearing plate 33. When the counter-bearing elements 22 are formed as balls 23, the bearing part 17 is not only moveable in the movement path 35 shown in FIG. 1 within the drawing plane from FIG. 1 relative to the counter-bearing part 21 but additionally also in a movement path 35 perpendicularly or at an angle to the drawing plane of FIG. 2. The counter-bearing elements 22 are fastened to the counter-bearing fastening device 23 with elastic components 27 as springs 29, for example made of metal, or a deformable, elastic, rod-shaped plastic, for example silicon. The bearing elements 18 include a contact surface 20 and the counter-bearing elements 22 include a counter-contact surface 26. A part of the bearing elements 18 lies with a contact surface 20 each on a counter-contact surface 26 each of a counter-bearing element 22 as the ball 23 or the roller 24. The counter-bearing elements 22 are mounted on the elastic component 27 with a mounting 36.

On the load compartment floor 12, i.e. on the bearing fastening device 30 of the bearing part 17, load items can be placed. For moving these load items, the bearing part 17 can be suitably moved in that a force is applied to the bearing part 17. The bearing elements 18 are connected fixed to the bearing part 17 so that the bearing elements 18 also perform a movement of the bearing part 17 with the same. Upon a movement of the bearing part 17 in the movement path 35, because of the contact between the part of the bearing elements 18 and the part of the counter-bearing elements 22, which lie on top of one another on the contact surfaces 20 and counter-contact surfaces 26, a deformation force is transmitted on the counter-bearing elements 22 by the bearing elements 18 and a movement of the counter-bearing elements 22 from a starting position into a deformation position brought about.

The counter-bearing element 22 shown on the left in FIG. 2 is situated in the starting position since this counter-bearing element 22 does not have any contact to a bearing element 18. During the movement of a counter-bearing element 22 each from the starting position into the deformation position, the ball 23 or the roller 24 rolls on the rolling surface 34 and the mounting 36 performs a translation movement. The counter-bearing element 22 shown in FIG. 3 in the middle is situated just before the deformation position as an end position since upon a further movement of the bearing part 17 the contact between the bearing part 18 and the counter-bearing element 22 is cancelled. Following the cancellation of the contact between a bearing element 18 and a counter-bearing element 22, an elastic recovery of the elastic component 27 occurs so that because of this a restoring force is exerted by the elastic component 27 on the counter-bearing element 22 and because of this the counter-bearing element 22 is moved back from the deformation position into the starting position. Thus, during a transition period a return movement of the counter-bearing element 22 from the deformation position into the starting position and during this transition period the counter-bearing element 22 does not have any contact with a bearing element 18.

During the movement of the counter-bearing element 22 from the starting position into the deformation position, an elastic deformation and elastic preload of the elastic component 27 occurs. During the movement of the bearing part 17 in the movement path 35, different counter-bearing elements are thus alternately contacted by the bearing elements 18 and after the commencement of the contact the counter-bearing elements 22 moved from the starting position into the deformation position and following the cancellation of the contact a return movement of the counter-bearing elements 22 from the deformation position into the end position occurs during the transition period. Upon a further movement of the bearing part 17, a renewed contacting of this counter-bearing element 22 by another bearing element 18 occurs. In the first exemplary embodiment shown in FIG. 2, the elastic component 27 is a separate component to complement the counter-bearing element 22. The mounting mechanism includes a plurality of bearing elements 18 and counter-bearing elements 22 which are not shown in FIG. 2 and the bearing elements 18 and counter-bearing elements 22 are substantially evenly distributed within a fictitious plane perpendicularly to the drawing plane of FIG. 2. For example, the mounting mechanism includes 50 bearing elements 18 and 50 counter-bearing elements 22.

Figure 3:
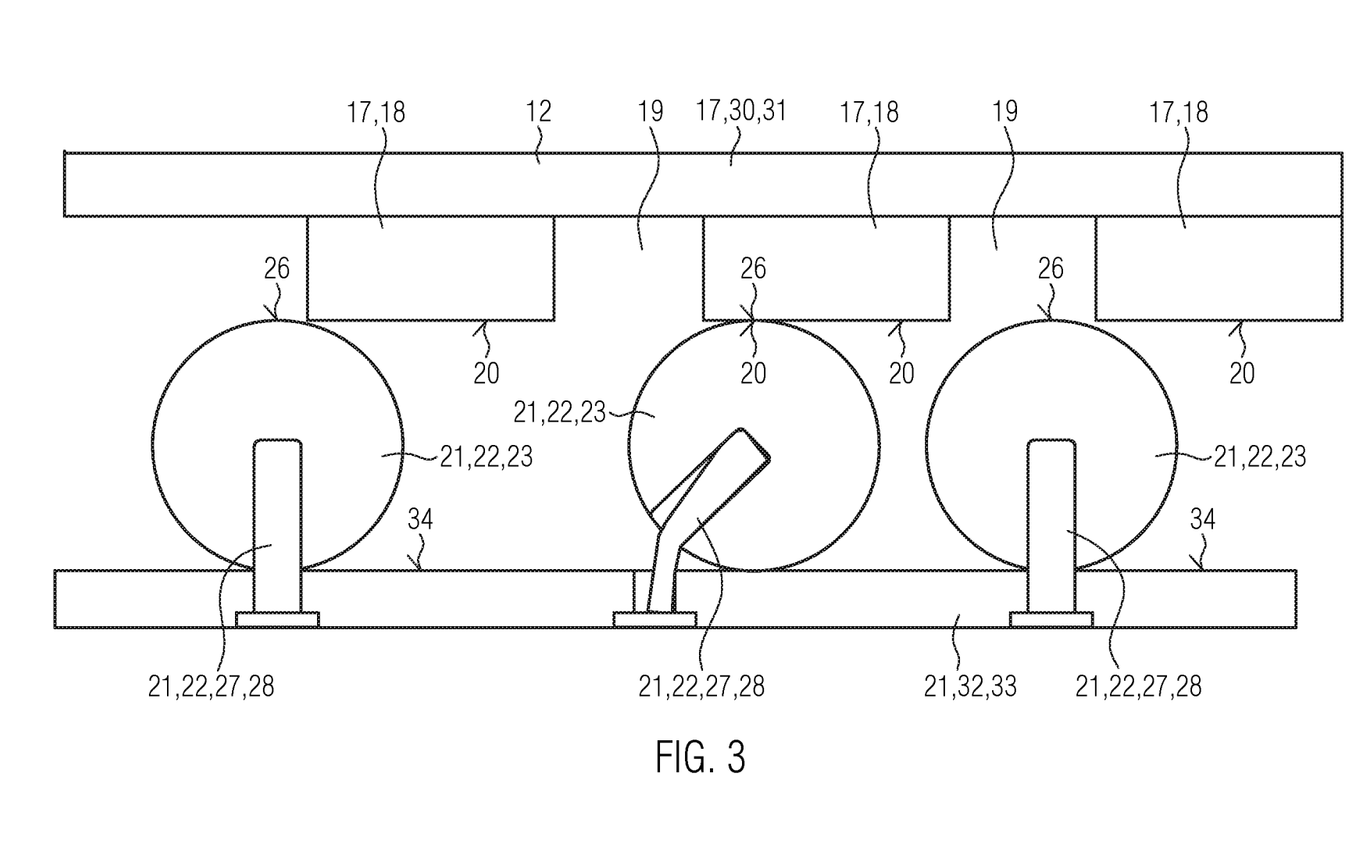
FIG. 3 shows a longitudinal section of the mounting mechanism in a second exemplary embodiment.

In FIG. 3, a second exemplary embodiment of the mounting mechanism 16 is shown. In the following, essentially on the differences to the first exemplary embodiment shown in FIG. 2 are described. The counter-bearing elements 22 are designed as balls 23 and the counter-bearing elements 22 are moveably fixed to the counter-bearing fastening device 32 by an elastic rod 28 as the elastic component 27. Upon a movement of the bearing part 17 in the movement path 35, an elastic bending of the elastic rod 28 occurs locally outside the ball 23 and this makes possible a slide rolling of the ball 23 on the rolling surface 34. Otherwise the mode of operation corresponds to the exemplary embodiment shown in FIG. 2.

Figure 4:
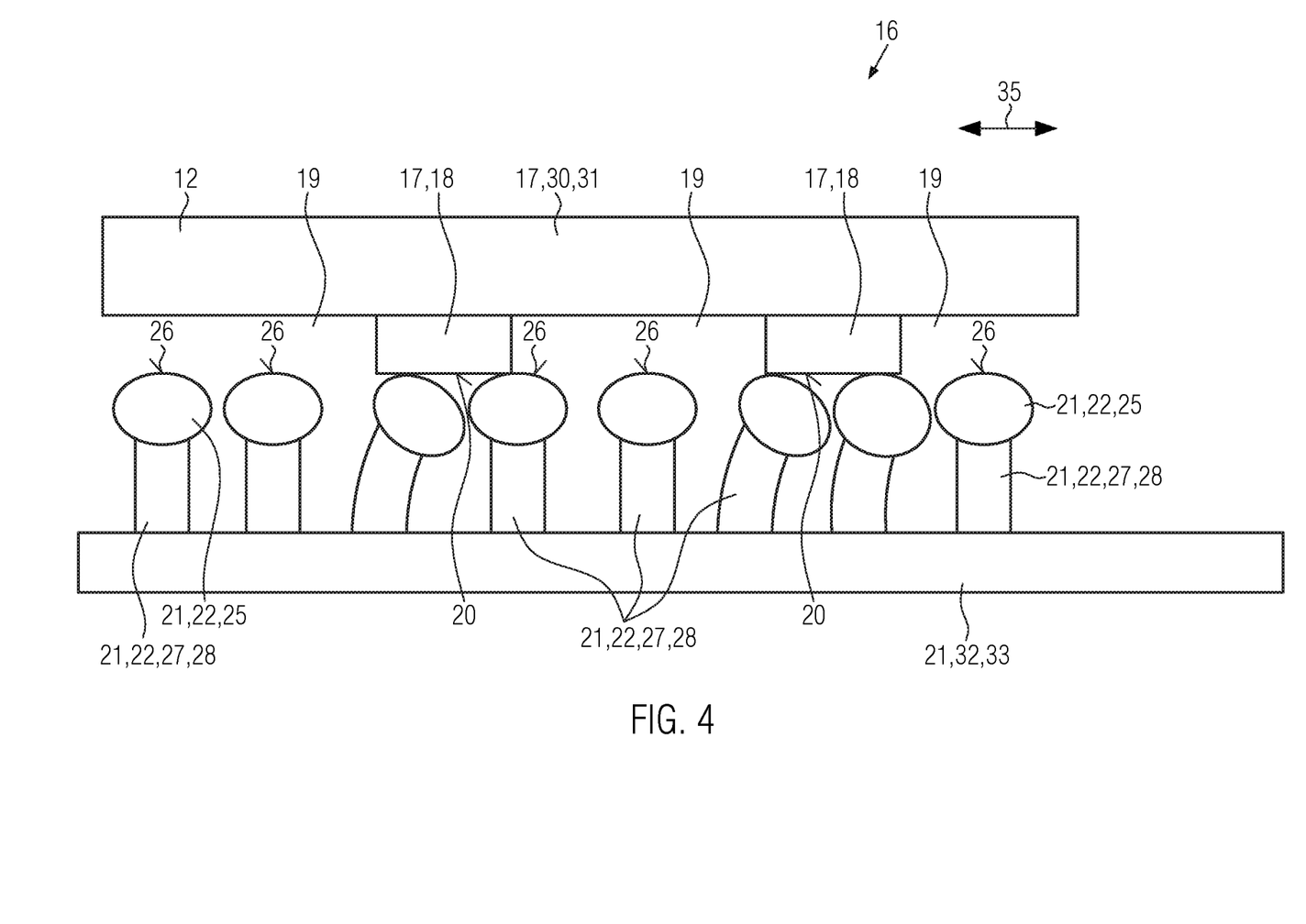
FIG. 4 shows a longitudinal section of the mounting mechanism in a third exemplary embodiment.

In FIG. 4, a third exemplary embodiment of the mounting mechanism 16 is shown. In the following, only the differences to the second exemplary embodiment shown in FIG. 3 are essentially described. The counter-bearing elements 22 are formed as ellipsoids 25 and the ellipsoids 25 are fastened to the counter-bearing fastening device 32 as the counter-bearing plate 33 by elastic rods 28 as the elastic components 27. The ellipsoids 25 as the counter-bearing elements 22 are very stiff and are essentially not deformable. The movement of the counter-bearing elements 22 as the ellipsoids 25 is made possible by an elastic bending or deformation of the elastic rods 28. Because of the kinematic of the local movement of the ellipsoids 25, a movement in the direction of the movement path 35 as a straight line substantially occurs upon a local movement of the ellipsoids 25 on the counter-contact surfaces 26 and to a very minor degree a movement in a direction perpendicularly to the movement path 35. This movement of the counter-contact surface 26 in a direction perpendicularly to the movement path 35 is however negligible in practice so that because of this the movement path 35 is substantially orientated as a straight line.

Figure 5:
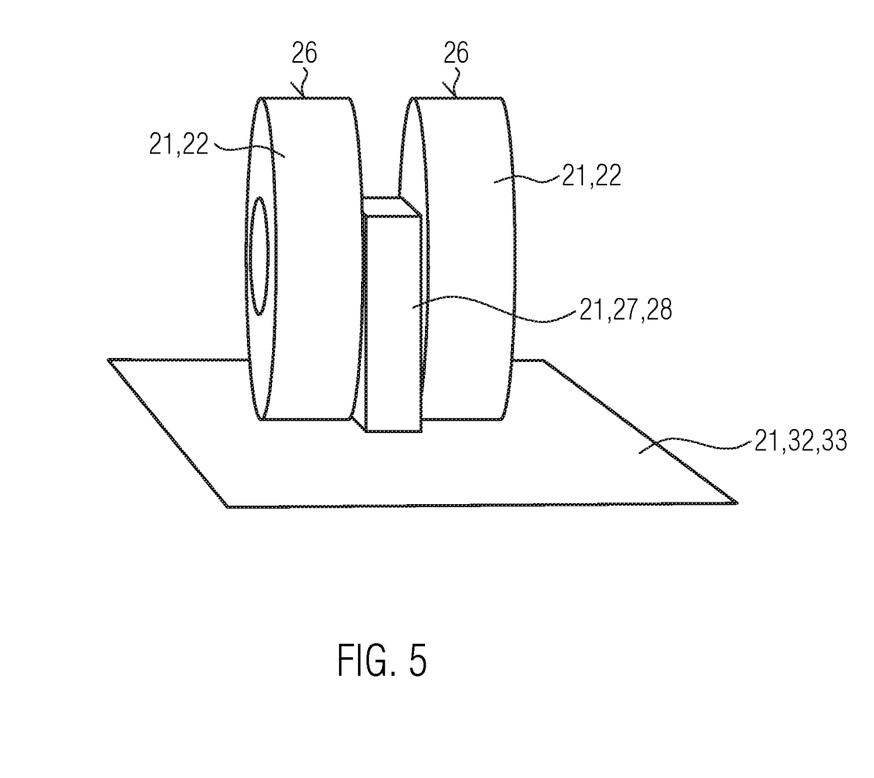
FIG. 5 shows a perspective view of a part of the mounting mechanism in a fourth exemplary embodiment.

In FIG. 5, a fourth exemplary embodiment of the mounting mechanism 16 is partly shown. The counter-bearing elements 22 are fastened to the elastic rod 28 and two counter-bearing elements 22 are mounted to a rod 28 here. Here, the counter-bearing elements 22 can be moved because of a bending of the elastic rod 28. On the elastic rod 28 shown in FIG. 5 two extension rods which are not shown are additionally formed and these extension rods are fastened within the counter-bearing elements 22. Optionally, the movement of the counter-bearing elements 22 can be additionally or exclusively performed because of a torsion of these extension rods.

Viewed as a whole, substantial advantages are connected to the mounting mechanism 16 according to the present disclosure, the method according to the present disclosure for mounting the moveable bearing part 17 relative to the counter-bearing part 21 and the motor vehicle 1 according to the present disclosure. The load compartment floor 12 can be easily and cost-effectively mounted with little installation space requirement using the mounting mechanism 16. Here, the bearing part 17 and the load compartment floor 12 can be optionally moveably mounted not only in a movement path 35 in longitudinal direction but additionally also in any movement path within a plane perpendicularly to the drawing plane of FIG. 1 with a suitable design of the mounting mechanism 16. In the version of the mounting mechanism 16 shown in FIG. 4, the counter-bearing part 21 can also be formed as a microstructure for example as a carpet or non-woven fabric.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A mounting mechanism for a load compartment floor in a vehicle comprising:
   a moveable bearing part having with a plurality of bearing elements, wherein each of the bearing elements have a contact surface; and
   a counter-bearing part having a plate, an elastic component extending from the plate and having a counter-bearing element which is locally moveable relative to the plate between a starting position and a deformation position, wherein the counter-bearing element has a counter-contact surface on which the contact surface of each bearing element engages to transmits a force from the bearing elements to the counter-bearing elements such that the bearing elements are operatively coupled to the counter-bearing elements;
   wherein a movement of the bearing part with the bearing elements causes a local relative movement of the counter-bearing element from the starting position into the deformation position due to the contact between the bearing elements and the counter-bearing element;
   wherein the counter-bearing element is in mechanical operative connection with the bearing elements and the local relative movement of the counter-bearing elements from the starting position into the deformation position causes an elastic deformation of the elastic component and after the termination of the mechanical operative connection an elastic recovery of the elastic component causes a turn movement of the counter-bearing element from the deformation position into the starting position; and
   wherein the counter-bearing elements on the counter-contact surfaces do not have substantially no elastic deformability perpendicular to the movement path of the moveable bearing part for force transmission from the bearing elements to the counter-bearing elements.

2. The mounting mechanism according to claim 1, further comprising gaps formed between the bearing elements to define a free space for the return movement of the counter-bearing elements from the deformation position into the starting position.

3. The mounting mechanism according to claim 1, wherein the counter-bearing elements are moveable on the counter-contact surfaces substantially parallel to the movement path of the moveable bearing part.

4. The mounting mechanism according to claim 1, wherein the moveable bearing part comprises a bearing plate with bearing elements formed thereon.

5. The mounting mechanism according to claim 4, wherein the bearing fastening device and the counter-bearing fastening device are configured flat or curved.

6. The mounting mechanism according to claim 4, wherein the bearing fastening device and the counter-bearing fastening device are configured curved.

7. The mounting mechanism according to claim 6, wherein a curvature of the bearing plate and of the counter-bearing plate substantially corresponds to a curvature of the movement path of the moveable bearing part.

8. A mounting mechanism for a load compartment floor in a vehicle comprising:
   a moveable bearing part having with a plurality of bearing elements, wherein each of the bearing elements have a contact surface;
   a counter-bearing part having a plate, an elastic component extending from the plate and having a counter-bearing element which is locally moveable relative to the plate between a starting position and a deformation position, wherein the counter-bearing element has a counter-contact surface on which the contact surface of each bearing element engages to transmits a force from the bearing elements to the counter-bearing elements such that the bearing elements are operatively coupled to the counter-bearing elements; and
   a plurality of counter-bearing elements, each counter-bearing element is configured with an elastic component extending from the counter-bearing plate,
   wherein a movement of the bearing part with the bearing elements causes a local relative movement of the counter-bearing element from the starting position into the deformation position due to the contact between the bearing elements and the counter-bearing element;
   wherein the counter-bearing element is in mechanical operative connection with the bearing elements and the local relative movement of the counter-bearing elements from the starting position into the deformation position causes an elastic deformation of the elastic component and after the termination of the mechanical operative connection an elastic recovery of the elastic component causes a turn movement of the counter-bearing element from the deformation position into the starting position.

9. The mounting mechanism according to claim 1, wherein the counter-bearing elements comprise at least one of a ball-shaped bearing or roller-shaped bearing.

10. The mounting mechanism according to claim 1, wherein the elastic component is a part of the counter-bearing element.

11. A motor vehicle comprising:
    a body having a load compartment for receiving load items;
    a moveable load compartment floor delimiting the load compartment and configured to support load items on the load compartment floor;
    a mounting mechanism according to claim 1 disposed between the load compartment and the moveable load compartment floor.

12. A method for mounting load compartment floor in a vehicle comprising:
    applying a bearing force with a moveable bearing part having a plurality of bearing elements to a partly fixed counter-bearing part with counter-bearing elements which are locally moveable relative to a counter-bearing plate between a starting position and a deformation position, wherein a contact surface of the bearing elements lies on a counter-contact surface of the counter-bearing element;
    exerting a force onto the moveable bearing part such that the moveable bearing part is moved relative to the counter-bearing part;
    transmitting a deformation force such that contact between the bearing elements and the counter-bearing elements on the contact surfaces and counter-contact surfaces and movement of the bearing part from the bearing elements to the counter-bearing elements causes a movement of the counter-bearing elements from a starting position into a deformation position and an elastic deformation of an elastic components extending between the counter-bearing plate and the counter-bearing element; and removing the force from the moveable bearing part cancels the contact between the bearing element and the counter-bearing element and elastically returns the bearing element on which the contact has been cancelled from the deformation position into the starting position because of an elastic recovery of the elastic component associated with the counter-bearing element.

13. The method according to claim 12, wherein the local relative return movement of the counter-bearing elements from the deformation position into the starting position is performed in gaps between the bearing elements.

14. The method according to claim 12, wherein during the movement of the bearing part relative to the counter-bearing part, the contact surfaces of the bearing elements in time contact the contact surfaces of different counter-bearing elements, wherein the respective bearing element for a respective bearing element in time in a transition period between the cancellation of the contact of a previous counter-bearing element and the establishment of the contact to a following counter-bearing element does not have any contact to a counter-bearing element in the transition period, and during the transition period the return movement of the respective previous counter-bearing element from the deformation position into the starting position is performed.

* * * * *